(12) United States Patent
Hoffman et al.

(10) Patent No.: US 11,820,543 B1
(45) Date of Patent: Nov. 21, 2023

(54) PHARMACEUTICAL ORDER PROCESSING SYSTEMS AND METHODS

(71) Applicant: Express Scripts Strategic Development, Inc., St. Louis, MO (US)

(72) Inventors: Robert E. Hoffman, Linden, IN (US); Robert E. Kennedy, Westfield, IN (US)

(73) Assignee: Express Scripts Strategic Development, Inc., St. Louis, MO (US)

(*) Notice: Subject to any disclaimer, the term of this patent is extended or adjusted under 35 U.S.C. 154(b) by 423 days.

(21) Appl. No.: 17/119,107

(22) Filed: Dec. 11, 2020

(51) Int. Cl.
| | | |
|---|---|---|
| *B65B 5/06* | (2006.01) | |
| *B65B 5/08* | (2006.01) | |
| *B65G 1/137* | (2006.01) | |
| *G05B 15/02* | (2006.01) | |
| *B65B 61/20* | (2006.01) | |

(52) U.S. Cl.
CPC ............. *B65B 5/08* (2013.01); *B65B 5/06* (2013.01); *B65B 61/20* (2013.01); *B65G 1/1371* (2013.01); *B65G 1/1378* (2013.01); *G05B 15/02* (2013.01); *B65G 2201/027* (2013.01); *B65G 2201/0235* (2013.01)

(58) Field of Classification Search
CPC ............. B65G 1/1378; B65G 1/1371; B65G 2201/0235; B65G 2201/027; B65B 5/08; B65B 5/06; B65B 61/20; G05B 15/02
See application file for complete search history.

(56) References Cited

U.S. PATENT DOCUMENTS

| | | | | |
|---|---|---|---|---|
| 4,824,311 A | * | 4/1989 | Mims ............... | B65G 1/0407 |
| | | | | 414/280 |
| 5,472,309 A | * | 12/1995 | Bernard, II ......... | B65G 1/0485 |
| | | | | 414/807 |
| 5,522,512 A | * | 6/1996 | Archer .................. | B07C 5/38 |
| | | | | 209/580 |
| RE40,510 E | * | 9/2008 | Lasher ................ | B65B 5/103 |
| | | | | 53/493 |
| 8,307,615 B2 | | 11/2012 | Gonzalez | |
| 9,159,357 B2 | | 10/2015 | Thompson | |
| 9,373,065 B1 | | 6/2016 | Hoffman | |
| 9,394,107 B1 | * | 7/2016 | Eller .................... | B07C 5/34 |
| 9,697,335 B2 | | 7/2017 | Joplin | |

(Continued)

FOREIGN PATENT DOCUMENTS

WO  WO-2013033745 A1 * 3/2013 ........... B65G 1/1371

*Primary Examiner* — Thomas Randazzo
(74) *Attorney, Agent, or Firm* — Stinson LLP

(57) ABSTRACT

A pharmaceutical order processing system for processing a plurality of pharmaceutical containers includes a container repository, a container selector, an order consolidator transporter and an order consolidator. The container repository supports the pharmaceutical containers. The container selector has a picker to pick the pharmaceutical containers from the pharmaceutical container repository. The container selector includes a carriage supporting the picker and movable relative to the container repository to move the picker around the container repository. The order consolidator receives the pharmaceutical containers and places the pharmaceutical containers in a shipping package. The order consolidator transporter receives the pharmaceutical containers after they have been picked by the picker and transports the pharmaceutical containers toward the order consolidator.

30 Claims, 4 Drawing Sheets

(56) References Cited

U.S. PATENT DOCUMENTS

| | | |
|---|---|---|
| 9,944,419 B2 | 4/2018 | Joplin |
| 9,978,036 B1 | 5/2018 | Eller |
| 10,053,248 B2 | 8/2018 | Joplin |
| 10,168,344 B2 | 1/2019 | Neeper |
| 10,294,029 B2 | 5/2019 | Joplin |
| 10,315,843 B2 | 6/2019 | Magens |
| 10,544,978 B2 | 1/2020 | Berchowitz |
| 10,661,993 B2 | 5/2020 | Joplin |
| 11,235,930 B2 * | 2/2022 | Bastian, II ........... B25J 15/0616 |
| 2004/0123564 A1 * | 7/2004 | McErlean ............... B65B 61/20 53/445 |
| 2015/0006005 A1 | 1/2015 | Yu |
| 2015/0278759 A1 | 10/2015 | Harris |
| 2015/0324944 A1 | 11/2015 | Lord |
| 2015/0353299 A1 | 12/2015 | Razumov |
| 2017/0015445 A1 * | 1/2017 | Holmes ............... G07F 11/1657 |
| 2019/0161276 A1 * | 5/2019 | Joplin ....................... B67B 3/26 |
| 2020/0126025 A1 | 4/2020 | Kumar |
| 2022/0185510 A1 * | 6/2022 | Hoffman ................. B65B 61/20 |

* cited by examiner

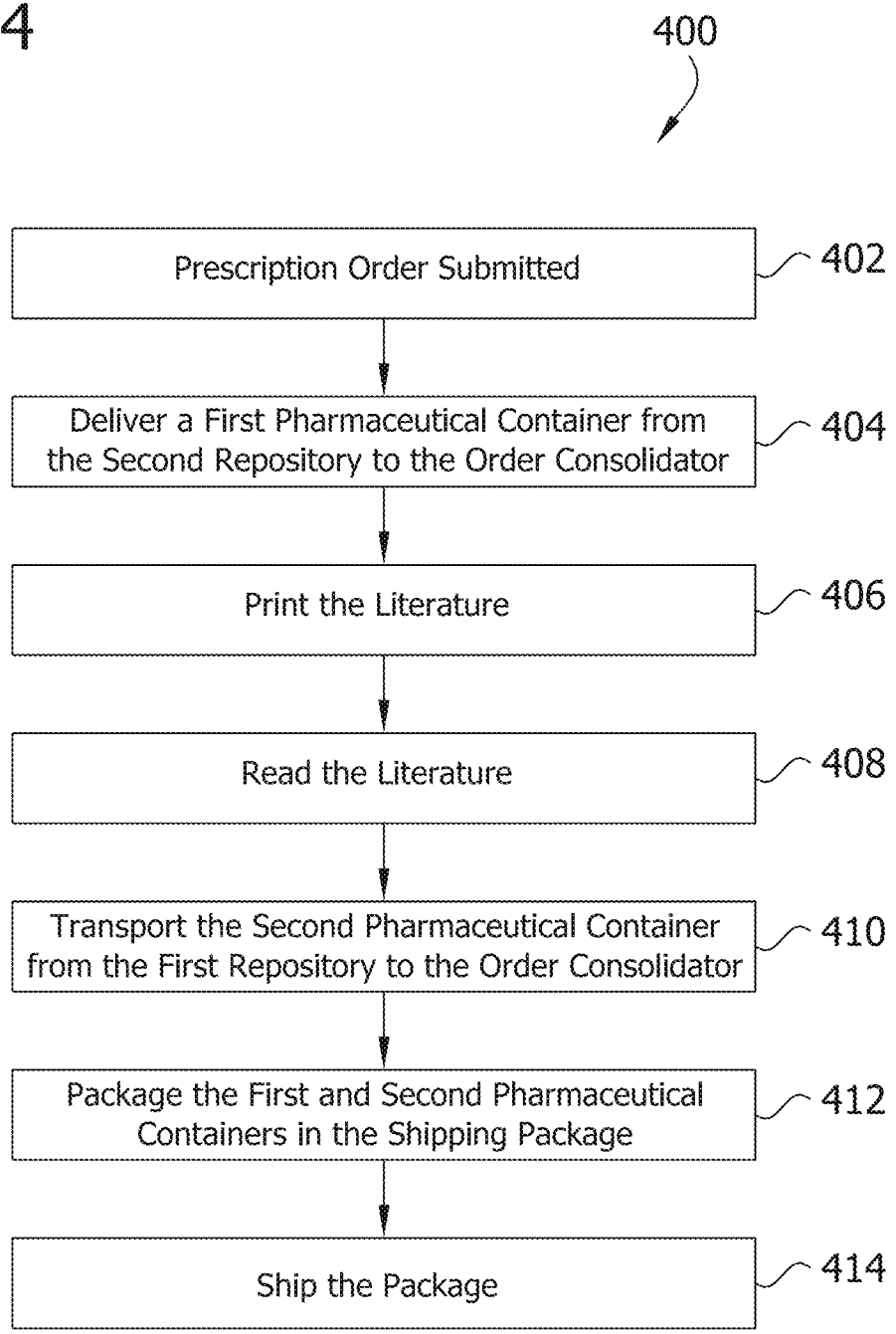

PHARMACEUTICAL ORDER PROCESSING SYSTEMS AND METHODS

FIELD

The present disclosure generally relates to pharmaceutical order processing systems, and more particularly to pharmaceutical order processing systems for processing pharmaceutical containers.

BACKGROUND

High volume pharmacies process and fulfill a large number of prescription orders per day. These pharmacies often rely on automated systems to process, fill, and pack one or more prescriptions together for delivery to a patient. These automated systems generally fit into one of two categories: (1) systems, such as high-volume fillers, that automatically fill pharmaceutical containers (e.g., auto-filled containers) with specific quantities of pharmaceuticals; and (2) systems, such as unit-of-use systems, that process unit-of-use products or containers. A unit-of-use container contains an entire prescription of a pharmaceutical and can therefore be sent to the patient without modifying the pharmaceutical(s) (e.g., the quantity, type, etc.) in the container and without product packaging modification (or with minimal product packaging modification) except for labeling with patient information. Unit-of-use products can include a full course of medicine to be taken by a patient, for example, an entire prescription (e.g., a thirty-day supply, a sixty-day supply, or a ninety-day supply). The unit-of-use products contain known quantities of medication in packages that are closed and sealed by, for example, the pharmaceutical manufacturer.

SUMMARY

In one aspect, a pharmaceutical order processing system for processing a plurality of pharmaceutical containers comprises a first pharmaceutical container repository configured to support a first group of pharmaceutical containers of the plurality of pharmaceutical containers. A container selector includes a picker configured to pick one or more pharmaceutical containers of the first group of pharmaceutical containers from the pharmaceutical container repository. The container selector includes a carriage supporting the picker. The carriage is movable relative to the pharmaceutical container repository to move the picker to different locations relative to the pharmaceutical container repository. An order consolidator is configured to receive the one or more pharmaceutical containers of the first group and to place the one or more pharmaceutical containers of the first group in a shipping package. An order consolidator transporter is configured to receive the one or more pharmaceutical containers of the first group after the one or more pharmaceutical containers have been picked by the picker and to transport the one or more pharmaceutical containers of the first group toward the order consolidator.

In another aspect, a method for processing a plurality of pharmaceutical containers comprises supporting, with a first pharmaceutical container repository, a first group of pharmaceutical containers of the plurality of pharmaceutical containers; moving a carriage supporting a picker relative to the pharmaceutical container repository; picking, with the picker, one or more pharmaceutical containers from the pharmaceutical container repository; transporting, with an order consolidator transporter, the one or more pharmaceutical containers of the first group to an order consolidator; and packaging, with the order consolidator, the one or more pharmaceutical containers of the first group in a shipping package.

Other objects and features of the present disclosure will be in part apparent and in part pointed out herein.

BRIEF DESCRIPTION OF THE DRAWINGS

FIG. 4 is an example flow diagram of the operation of the pharmaceutical order processing system according to another embodiment of the present disclosure.

Corresponding reference characters indicate corresponding parts throughout the drawings.

DETAILED DESCRIPTION

Figure 1:
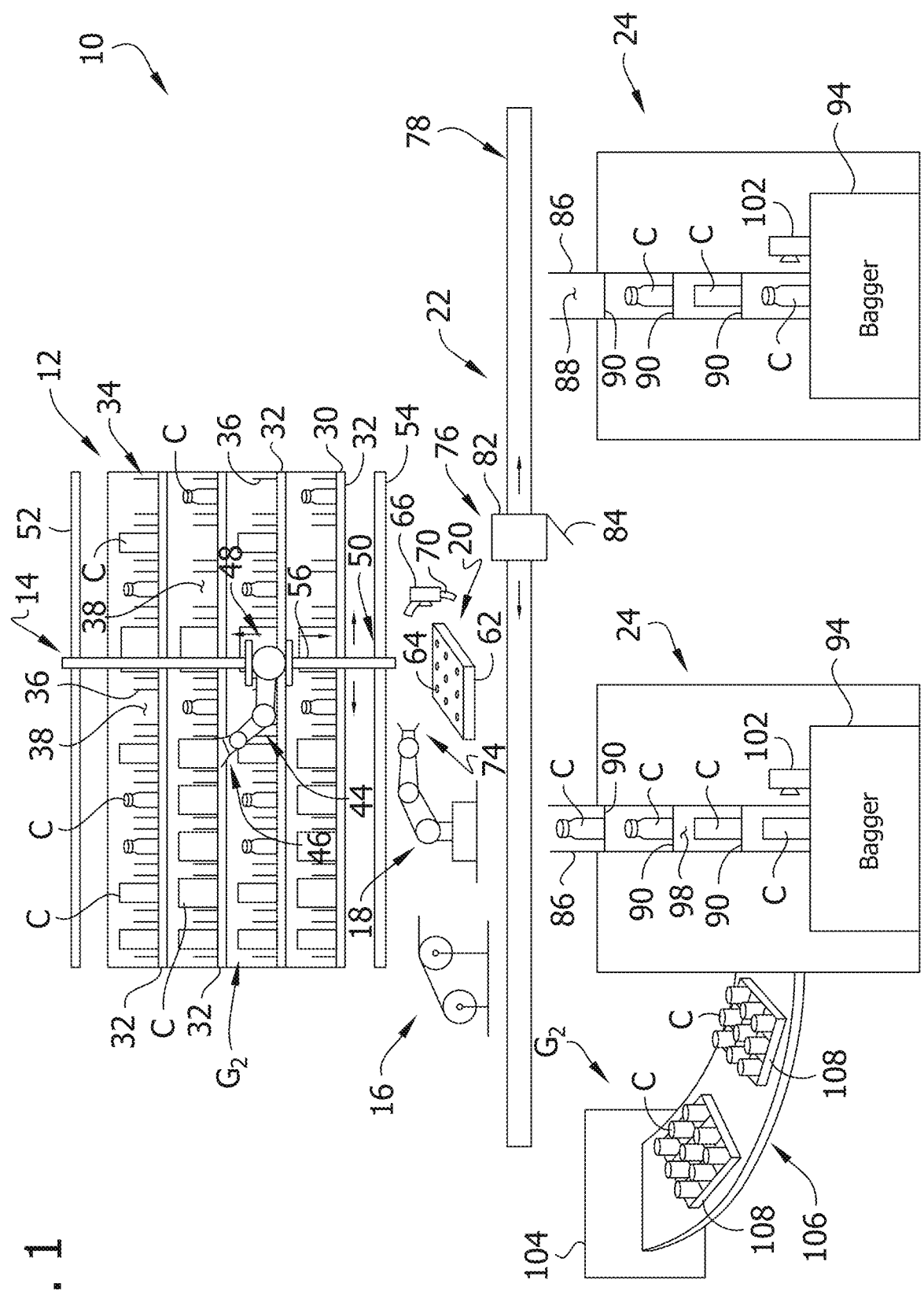
FIG. 1 is a schematic elevation of a pharmaceutical order processing system according to one embodiment of the present disclosure.

Referring to the drawings, FIG. 1 illustrates a pharmaceutical order processing system (e.g., pharmaceutical container processing system) according to one embodiment of the present disclosure, indicated generally by reference numeral 10. The pharmaceutical order processing system 10 processes prescription orders received by the system. A prescription order may include one or more pharmaceuticals (e.g., prescription drugs), which are contained in pharmaceutical containers C. The pharmaceutical containers C may be in the form of a bottle, a box, or any other suitable container. The pharmaceutical order processing system 10 comprises a unit-of-use system that processes pharmaceutical containers C that are unit-of-use products. The pharmaceutical order processing system 10 generally stores, monitors, labels, dispenses and packages the unit-of-use pharmaceutical containers C. However, the pharmaceutical order processing system 10 may also be used with or include non-unit-of-use systems, such as a high-volume pharmaceutical order processing system (e.g., a high-volume filler), to facilitate the processing of pharmaceutical containers C that are not unit-of-use products, as explained in more detail below. Further details on pharmaceutical order processing systems and components thereof, including unit-of-use systems, may be found in U.S. Pat. Nos. 9,373,065, 9,697,335, 9,944,419, 9,978,036, and 10,053,248, the entireties of which are hereby incorporated herein by reference. However, it will be appreciated that the systems and components disclosed herein can be used in other contexts without departing from the scope of the present disclosure.

The pharmaceutical order processing system 10 (e.g., system) processes the pharmaceutical containers C (e.g., a plurality of pharmaceutical containers) to fill prescription orders. To process the plurality of pharmaceutical containers C, the system 10 may include a pharmaceutical container repository 12, a container selector 14, a labeler 16, a label transporter 18, a container holder 20, an order consolidator transporter 22 and/or an order consolidator 24. The system 10 may include several (e.g., two or more) of each of these components. Generally, the pharmaceutical container repository 12, the container selector 14, the labeler 16, the label transporter 18, the container holder 20, the order consolidator transporter 22 and the order consolidator 24 are used to process the unit-of-use pharmaceutical containers C by storing, monitoring, labeling, dispensing, transporting, verifying and/or packaging the pharmaceutical containers to fill a prescription order received by the system 10. Accordingly, the system 10 is an automated system use to auto-fill or auto-process received prescription orders.

The pharmaceutical container repository 12 (e.g., a first pharmaceutical container repository) contains pharmaceutical containers C. In the illustrated embodiment, the repository 12 is configured to support at least a portion of the pharmaceutical containers C. Specifically, the repository 12 is configured to store (e.g., hold) a first group $G_1$ of the pharmaceutical containers C. The pharmaceutical containers C making up the first group $G_1$ are unit-of-use containers. Thus, the repository 12 is a unit-of-use repository for storing unit-of-use pharmaceutical containers C. The repository 12 receives and holds the pharmaceutical containers C and can hold many different types of pharmaceutical containers (e.g., types of pharmaceuticals). The repository 12 can be configured to hold pharmaceutical containers C of different shapes and of generally any size. In one embodiment, the pharmaceutical containers C are manually loaded onto (e.g., into) the repository 12 by an operator.

In the illustrated embodiment, the repository 12 includes a frame 30 with a plurality (broadly, at least one) of shelves or racks 32 configured to support (e.g., hold) the pharmaceutical containers C of the first group $G_1$. In the illustrated embodiment, the repository 12 includes four racks 32, although more or fewer racks are within the scope of the present disclosure. Each rack 32 may support many different types, shapes, sizes, etc. of pharmaceutical containers C. The racks 32 are generally identical. Each rack 32 includes a plurality of guide sets 34. Each guide set 34 includes two guides 36 (e.g., walls) which define a channel 38 (e.g. container channel) therebetween. The channel 38 is sized and shaped so that the pharmaceutical containers C are arranged one after another (e.g., single file) in the channel. The guides 36 are preferably movable relative to one another to adjust the size (e.g., width) of the channel 38 to conform to the size (e.g., width) of the pharmaceutical containers C placed therein. For example, the guides 36 can move toward or away from one another to increase or decrease the width of the channel 38. The guides 36 may move conjointly in opposite directions. Preferably, the guides 36 are equally spaced from a centerline of the channel 38. In one embodiment, both the guides 36 move (e.g., move simultaneously) to change the size of the channel 38 and move in such a manner that they remain equally distant from a centerline of the channel. For example, both guides 36 move outward (e.g., away from one another) by the same distance to enlarge the size of the channel 38 and move inward (e.g., toward one another) by the same distance to reduce the size of the channel. This keeps the centerline of the channel 38 in the same position, regardless of the size of the channel, which helps facilitate the removal of the pharmaceutical containers C from the repository 12 by the container selector 14. Keeping the centerline of the channel 38 in the same position reduces the amount of calibrating that needs to be done with the container selector 14 when the size of the channel 38 is changed. In operation, each channel 38 of the repository 12 is filled with the same type of pharmaceutical containers C (e.g., all the pharmaceutical containers in the channel contain the same type and quantity of a pharmaceutical).

Each rack 32 includes at least one mover (e.g., a plurality of movers) configured to move the pharmaceutical containers C in the channels 38. In the illustrated embodiment, each mover comprises a conveyor 40 (FIG. 2), although other movers are within the scope of the present disclosure. Each conveyor 40 supports the pharmaceutical containers C (e.g., at least a portion of the pharmaceutical containers of the first group $G_1$). The conveyors 40 define the bottom of the channels 38. Desirably, the conveyors 40 generally have a movable support surface (e.g., the conveyors are powered conveyors) on which the pharmaceutical containers C rest. In other embodiments, the support surface may be stationary and at an angle (e.g., a slide) to enable the pharmaceutical containers C to slide thereon (e.g., the conveyors are non-powered conveyors). One conveyor 40 may define the bottom of multiple channels 38, or each channel 38 can have its own associated conveyor. The conveyors 40 move the pharmaceutical containers C in the channel 38 toward a pick-up location located at the front of the repository 12. The pick-up location is generally at the forward end of the channel 38. The conveyors 40 move the pharmaceutical containers C forward toward (e.g., into) the pick-up location, where the container selector 14 picks the pharmaceutical containers. The repository 12 has an open, front face (e.g., window) which permits the container selector 14 to grab a pharmaceutical container C from one of the pick-up locations of the repository. Accordingly, as the container selector 14 removes pharmaceutical containers C from the pick-up locations of the repository 12, the conveyors 40 move subsequent pharmaceutical containers into the pick-up positions. Each rack 32 may include a container sensor 42 (FIG. 2) at each pick-up location. The container sensor 42 is configured to detect the presence of a pharmaceutical container C at the pick-up location. The container sensor 42 may comprise any suitable sensor for detecting the presence of a pharmaceutical container such as but not limited to a proximity sensor (e.g., a photoelectric sensor). In one embodiment, the container sensor 42 and conveyors 40 operate as a closed-loop system, with the conveyor 40 operating (e.g., moving) automatically after the container sensor no longer detects the presence of a pharmaceutical container C and continuing to move until the container sensor detects the presence of a pharmaceutical container, at which point the conveyor stops. Other configurations of the repository 12 are within the scope of the present disclosure.

Still referring to FIG. 1, the container selector 14 grabs the pharmaceutical containers C from the repository 12. The container selector 14 includes a picker 44 configured to pick the pharmaceutical containers C from the repository 12. In the illustrated embodiment, the picker 44 comprises a robot such as a six-axis robotic arm, although other robots are within the scope of the present disclosure. For example, the picker 44 may comprise a selective-compliance-articulated robotic arm, a cylindrical robot, a delta robot, a polar coordinate robot, a vertically articulated robot, a Cartesian coordinate robot or any other suitable device. The picker 44 includes a gripper 46 configured to grip (e.g., grab, pick-up) the pharmaceutical containers C from the pick-up locations at the front ends of the channels 38. The gripper 46 may be any suitable device for grabbing a container C. For example, the gripper 46 can include jaws, multiple fingers, suction devices, etc. to grip boxes or bottles. The gripper 46 can be electrically driven, hydraulically driven and/or pneumatically driven. The container selector 14 also includes a carriage 48. The carriage 48 supports the picker 44. In the illustrated embodiment, the picker 44 is mounted to the carriage 48. The carriage 48 is movable relative to the repository 12 to move the picker 44 to different locations relative to the repository. This allows the picker 44 to reach numerous different (e.g., all of the) pick-up locations to pick up different pharmaceutical containers C. In the illustrated embodiment, the system 10 includes one container selector 14 (e.g., one picker 44 and carriage 48) but, in other embodiments, the system may include multiple container selectors. For example, the system 10 can include two or three container selectors 14 for picking pharmaceutical containers C from the repository 12.

The container selector 14 includes a gantry 50 for moving the carriage 48. In the illustrated embodiment, the gantry 50 includes upper and lower rails 52, 54 and a cross rail 56 extending between the upper and lower rails. The upper and lower rails 52, 54 are generally horizontal and are positioned respectively above and below the repository 12. The cross rail 56 extends between and is movably mounted to the upper and lower rails 52, 54. The carriage 48 is movably mounted on the cross rail 56. The carriage 48 is movable in at least one of a generally horizontal direction or a generally vertical direction, and preferably, in both a generally horizontal direction and a generally vertical direction. The gantry 50 can include a first prime mover 58, such as an electric motor, operatively coupled to the cross rail 56 to move the cross rail along (e.g., horizontally back and forth) the upper and lower rails 52, 54. The gantry 50 can also include a second prime mover 60, such as an electric motor, operatively coupled to the carriage 48 to move the carriage along (e.g., vertically up and down) the cross rail 56. Accordingly, the gantry 50 can move the carriage 48 horizontally and vertically to move the picker 44 about the repository 12 to position the picker to grab a pharmaceutical container C from generally any channel 38. The gantry 50 can move the carriage 48 before the picker 44 grabs a pharmaceutical container C and after grabbing (or while the picker is holding) the pharmaceutical container. In an embodiment with multiple pickers 44 and carriages 48, the gantry 50 may include multiple cross rails 56 (all mounted on the same upper and lower rails 52, 54), each cross rail supporting one of the carriages and pickers 44.

The labeler 16 of the system 10 is configured to apply a label (e.g., a patient specific label) to the pharmaceutical containers C. In one embodiment, the labeler 16 may print and then apply the label to the pharmaceutical container C. The labeler 16 applies the label after the pharmaceutical container C has been picked by the container selector 14. Labelers are generally known in the art, and thus a further description of labeler 16 is omitted herein. For example, the labeler 16 may be a pass through labeler that applies the label to the pharmaceutical container C as the container is moved through the labeler by another component, such as the picker 44 or label transporter 18. After the container selector 14 grabs a pharmaceutical container C, the container selector 14 moves the pharmaceutical container generally towards the labeler 16. This movement may be accomplished by the picker 44 moving and/or the carriage 48 moving. In one embodiment (not shown), the container selector 14 (e.g., picker 44) may move the pharmaceutical container C to (and through) the labeler 16 to apply the label to the pharmaceutical container. In the illustrated embodiment, the container selector 14 moves the picked pharmaceutical container C to the container holder 20 of the system 10. The container holder 20 is configured to receive and hold a pharmaceutical container C from the container selector 14. In this embodiment, after picking a pharmaceutical container C, the container selector 14 moves the container and deposits (e.g., places) the container with (e.g., on) the holder 20. By placing the pharmaceutical container C on the holder 20, instead of moving it directly to the labeler 16, the cycle time for the container selector 14 to pick a pharmaceutical container is reduced, allowing the system 10 to process more pharmaceutical containers in a given time frame. In the illustrated embodiment, the holder 20 includes a support platform or plate 62 defining a support surface on which the container selector 14 places the pharmaceutical container C. Desirably, the holder 20 is configured to hold (e.g., grip) the pharmaceutical container C. In the illustrated embodiment, the support platform 62 includes (e.g., defines) one or more openings or apertures 64 (e.g., vacuum ports) in the support surface that are fluidly coupled to a negative pressure source 68, such as a vacuum. The negative pressure source, via the openings 64, applies suction to the pharmaceutical container C to hold the container on the support platform 62. This way, the holder 20 inhibits the pharmaceutical container C form moving after the holder receives the pharmaceutical container from the container selector 14. In one embodiment, the holder 20 may be used to temporarily hold and store a container C for pre-staging with the labeler 16 (e.g., the staging of a container while another container is being labeled), for accommodating product back log and/or for accommodating product flow issues.

In one embodiment, the holder 20 may include one or more identification sensors 66. The one or more identification sensors 66 are configured to scan the pharmaceutical container C to verify the identity of the pharmaceutical container. Each identification sensor 66 may read or scan a machine readable marking (e.g., a barcode, QR code, etc.) on the pharmaceutical container C held by the holder 20. By reading the machine readable marking on the pharmaceutical container C, the identity or type of the pharmaceutical container can be verified or confirmed to ensure the container selector 14 picked the correct pharmaceutical container from the repository 12. The identification sensor 66 may comprise a camera, a barcode scanner or any other suitable device. The one or more identification sensors 66 may be mounted on a sensor support 70. The sensor support 70 may move (e.g., rotate) the one or more identification sensors 66 about the pharmaceutical container C to read the machine readable marking on the container, regardless of the orientation the machine readable marking. The holder 20 may include a prime mover 72 (e.g., a support prime mover), such as an electric motor or solenoid, operatively coupled to the sensor support 70 for moving (e.g., rotating) the sensor support and identification sensors 66. In one example, the holder 20 may include four identification sensors 66 spaced equally about the support platform 62 and the sensor support 70 may rotate the identification sensors approximately 90 degrees about the support platform. As a result, 360 degrees of coverage for the pharmaceutical container C is obtained, ensuring at least one of the four identification sensors 66 will read the machine readable marking on the container.

Still referring to FIG. 1, the label transporter 18 of the system 10 is configured to transport the pharmaceutical container C to the labeler 16 after the container has been picked by the picker 44 of the container selector 14. The label transporter 18 is configured to grab the pharmaceutical container C from the holder 20. In one embodiment, the label transporter 18 applies a sufficient amount of force to overcome the suction force to remove the pharmaceutical container C from the holder 20. In other embodiments, the supply of suction to the holder 20 can be reduced, blocked, or turned off to permit the pharmaceutical container C to be removed from the holder. Preferably, the suction force holding the pharmaceutical container C is relatively small to allow the container to be easily removed from the holder by the label transporter 18. The label transporter 18 may include a gripper 74 configured to grip (e.g., grab, pick-up) the pharmaceutical containers C from the holder 20. After the label transporter 18 grabs the pharmaceutical container C, the label transporter may move the pharmaceutical container to (and through) the labeler 16 to apply the label to the pharmaceutical container. In the illustrated embodiment, the label transporter 18 is configured to deliver the pharmaceutical container C to the order consolidator transporter 22. After the label is applied to the pharmaceutical container C, the label transporter 18 moves the container to the order consolidator transporter 22. In the illustrated embodiment, the label transporter 18 comprises a robot such as a six-axis robotic arm. However, the transporter 18 can comprise other robots such as a selective-compliance-articulated robotic arm, a cylindrical robot, a delta robot, a polar coordinate robot, a vertically articulated robot, a Cartesian coordinate robot or any other suitable device. Other configurations of the label transporter are within the scope of the present disclosure.

Together the labeler 16, the label transporter 18 and the container holder 20 may be considered a labeling assembly. The system 10 can include two or more labeling assemblies. For example, if the system 10 includes two or more container selectors 14, the system will preferably have a labeling assembly for each container selector.

The order consolidator transporter 22 of the system 10 is configured to receive the pharmaceutical container C after the pharmaceutical container has been picked by the picker 44 of the container selector 14 and to transport the pharmaceutical container toward (e.g., to) the order consolidator 24. In the illustrated embodiment, the system 10 includes multiple (e.g., two or more) order consolidators 24 and the order consolidator transporter 22 is configured to transport the pharmaceutical container to one of the order consolidators. In the illustrated embodiment, the order consolidator transporter 22 includes a shuttle 76 movably mounted on a track or rail 78. The order consolidator transporter 22 may include a prime mover 80 (FIG. 2) (e.g., shuttle prime mover), such as an electric motor, operatively coupled to the shuttle 76 and configured to move the shuttle along (e.g., back and forth on) the track 78. The track 78 generally extends between the one or more order consolidators 24 of the system 10 and by the label transporter 18, thereby allowing the shuttle 76 to move between the label transporter and the one or more order consolidators to receive and deliver the pharmaceutical containers C. The shuttle 76 includes a hopper 82 having (e.g., defining) a container receiving space sized and shaped to receive and hold the pharmaceutical container C. The shuttle 76 is configured to deliver (e.g., feed) the pharmaceutical container C to the order consolidators 24. The hopper 82 of the shuttle 76 includes a bottom door 84. In the closed position, the door 84 generally closes or blocks a bottom opening (not shown) in the hopper 82. In the open position, the door 84 is spaced away from the bottom opening to permit a pharmaceutical container C contained in the hopper 82 to fall out of the hopper, through the bottom opening, and into one of the order consolidators 24. The shuttle prime mover 80 moves the shuttle 76 along the track 78 until the hopper 82 (e.g., the bottom opening) is aligned with one of the order consolidators 24. When aligned, the door 84 is opened to permit the pharmaceutical container C to move (e.g., fall) to the order consolidator 24 (e.g., deliver the container to the order consolidator). In one embodiment, the order consolidator transporter 22 can have more than one shuttle 76 and can have the multiple shuttles on one or more tracks 78. Other configurations of the order consolidator transporter 22 are within the scope of the present disclosure. For example, in one embodiment, the transporter 22 can include two or more shuttles that can move simultaneously. In another embodiment, the transporter 22 can include two or more tracks, each with one or more shuttles. Having multiple shuttles and/or tracks enables the system to process more containers and delivery the containers to multiple order consolidators 24 and/or baggers 94 simultaneously.

Still referring to FIG. 1, the order consolidator 24 of the system 10 generally prepares pharmaceutical containers C for shipping to the patients. The order consolidator 24 can pack (e.g., place) the pharmaceutical containers C in a shipping package for shipping to the patient. When packing the pharmaceutical containers C, the order consolidator 24 can also pack corresponding literature (e.g., a literature pack) for the pharmaceutical containers in the shipping package. The literature may be in the form of a slip, sheet, pamphlet, book, and the like and may contain information (e.g., directions) related to the pharmaceuticals in the pharmaceutical container and/or other information (e.g., patient information) related to the prescription order. If a prescription order requires two or more pharmaceutical containers C to fill the prescription order, the order consolidator 24 may also consolidate (e.g., combine, marry) the two or more pharmaceutical containers C (and corresponding literature) into the same shipping package. In the illustrated embodiment, the system 10 includes two order consolidators 24, although more or fewer order consolidators are within the scope of the present disclosure.

Each order consolidator 24 is configured to receive the pharmaceutical containers C that are picked from the repository 12. In particular, the order consolidator 24 receives the pharmaceutical containers C from the order consolidator transporter 22. In the illustrated embodiment, the order consolidator 24 includes a chute 86 (e.g., container chute) configured to receive the pharmaceutical containers C from the order consolidator transporter 22. The chute 86 includes (e.g., defines) a container passageway 88 through which the pharmaceutical containers C move. The container passageway 88 is sized and shaped to permit the pharmaceutical containers C to move therethrough. The container passageway 88 has an open top, permitting the pharmaceutical containers C to move (e.g., fall) into the container passageway from the order consolidator transporter 22. The chute 86 is configured to store (e.g., stage) pharmaceutical containers C in a generally stacked arrangement. The chute 86 may include dividers 90 (e.g., container dividers) in the container passageway 88 and dividing the container passageway into sections, with each section sized and shaped to receive one pharmaceutical container C. Each divider 90 may define a support surface which supports the pharmaceutical container C. The dividers 90 may be operatively connected to a prime mover 92 (FIG. 2) (e.g., divider prime mover) to move the dividers, and therefore pharmaceutical containers C, downward in the container passageway 88 to move the pharmaceutical containers C for further processing by the order consolidator 24 and to open up a section at the top of the container passageway to receive another pharmaceutical container from the order consolidator transporter 22. Thus, the dividers 90 may repeatedly cycle through the container passageway 88, starting at the top and then moving downward before returning back to the top of the passageway.

The order consolidator 24 includes a bagger 94. The bagger 94 is configured to pack the pharmaceutical container (s) C and literature of a prescription order in a package (not shown) for shipment. The package may be a box, a bag or any other suitable delivery package. In one embodiment, the bagger 94 comprises a wrap seal bagger, although other suitable baggers are within the scope of the present disclosure. The bagger 94 is operatively coupled to the chute 86 to receive the pharmaceutical container C after the container leaves the chute. Preferably, the chute 86 feeds the bagger 94 directly. After the bagger 94 receives the one or more pharmaceutical containers C of a prescription order, the bagger packages the pharmaceutical containers and corresponding literature in the package. The bagger 94 may also label the package with the patient's name and address. In one embodiment, the bagger 94 includes a literature processor 96 configured to supply the literature corresponding to the prescription order for packaging with the pharmaceuticals containers C. The literature processor 96 may include a printer 98 for printing the literature. The literature processor 96 may also include a literature reader or scanner 100 (e.g., a literature pack reader) configured to read the literature. The literature reader 100 may read a machine readable marking (e.g., barcode, QR code, etc.) of the literature. The literature reader 100 may read the literature to build the prescription order. For example, the container selector 14 may be configured to pick a pharmaceutical container C from the repository 12 based on the read literature by the literature reader 100, as described in more detail below. The literature processor 96 may also fold, staple and/or otherwise prepare the literature for inclusion with the pharmaceutical container(s) C in the package. After the package is prepared by the bagger 94, the package is then shipped to the patient. In some embodiments, the literature processor 96 may be separate from the bagger 94 (and operatively coupled to the bagger to supply the bagger with literature). In some embodiments, the bagger 94 may be a separate, standalone unit that receives the pharmaceutical containers C directly from the order consolidator transporter 22.

The order consolidator 24 may include one or more identification sensors 102, which are similar or identical to identification sensors 66. The one or more identification sensors 102 are configured to scan the pharmaceutical container C to verify the identity of the pharmaceutical container before the pharmaceutical container moves to the bagger 94. The one or more identification sensors 102 may be mounted on a moveable (e.g., rotatable) sensor support (not shown), like identification sensors 66 described above, to obtain 360 degrees of coverage for the pharmaceutical container C to ensure the one or more identification sensors will read the machine readable marking on the container. In the illustrated embodiment, the identification sensors 6102 are aligned with the chute 86 to scan the pharmaceutical container while the container is in the chute (and before the pharmaceutical container reaches the bagger 94). Other configurations of the identification sensors 102 are within the scope of the present disclosure.

Still referring to FIG. 1, the system 10 may include, broadly, another pharmaceutical container repository 104 (e.g., second pharmaceutical container repository) that contains additional pharmaceutical containers C. These additional pharmaceutical containers C are part of a second group $G_2$ (to distinguish these containers from the containers originating from the first repository 12) of the plurality of pharmaceutical containers that can be processed by the system 10. The second repository 104 is configured to supply the pharmaceutical containers C to (e.g., directly to) one or more of the order consolidators 24. Accordingly, the second repository 104 may be operatively coupled to one or more of the order consolidators 24. In the illustrated embodiment, a conveyor system 106 (broadly, a container transporter) transports the pharmaceutical containers C from the second repository 104 to one of the order consolidators 24. In the illustrated embodiment, the pharmaceutical containers C from the second repository 104 are transported on trays 108, that are moved by the conveyor system 106. Each tray 108 may hold a plurality of pharmaceutical containers C, such as about 24 pharmaceutical containers. In other embodiments, the pharmaceutical containers C may be loose and supported directed by the conveyor system 106 (e.g., not disposed in trays 108). For example, the conveyor system 106 may deliver the pharmaceutical containers C from the second repository 104 in a single file line to the order consolidator 24. The order consolidator 24 receives the pharmaceutical containers C from the second repository 104 and may pack the pharmaceutical containers C of the second group $G_2$ with pharmaceutical containers of the first group $G_1$ (e.g., from the first repository 12). Accordingly, if a prescription order requires pharmaceutical containers C (e.g., a unit-of-use container and an auto-filled container) from different sources (e.g., first repository 12 and a second repository 104), the order consolidator 24 can combine these pharmaceutical containers C from different sources into a single package for shipping, to fill the prescription order. In one embodiment, the second repository 104 comprises a high volume filler (not separately numbered) configured to fill the pharmaceutical containers C of the second group $G_2$ with pharmaceuticals. Accordingly, the second repository 104 is an automated filler that fills pharmaceutical containers with specific quantities of pharmaceuticals, as opposed to the unit-of-use repository 12. The use of other types of pharmaceutical container repositories (broadly, pharmaceutical container sources) with system 10 are within the scope of the present disclosure.

As is now apparent, the system 10 can combine multiple different pharmaceutical containers C from different sources (e.g., different groups $G_1$, $G_2$) into the same package for shipping to a patient. The order consolidator(s) 24 may be configured to receive pharmaceutical containers C from different pharmaceutical container sources (e.g., the first repository 12 and the second repository 104) that store, hold, fill, etc. pharmaceutical containers. Such capability allows different types of pharmaceutical containers C, such as unit-of-use pharmaceutical containers, auto-filled pharmaceutical containers, etc., to be packed together in the same shipping package as needed to fill a prescription order (e.g., the prescription order includes both unit-of-use pharmaceutical containers and auto-filled pharmaceutical containers).

Figure 2:
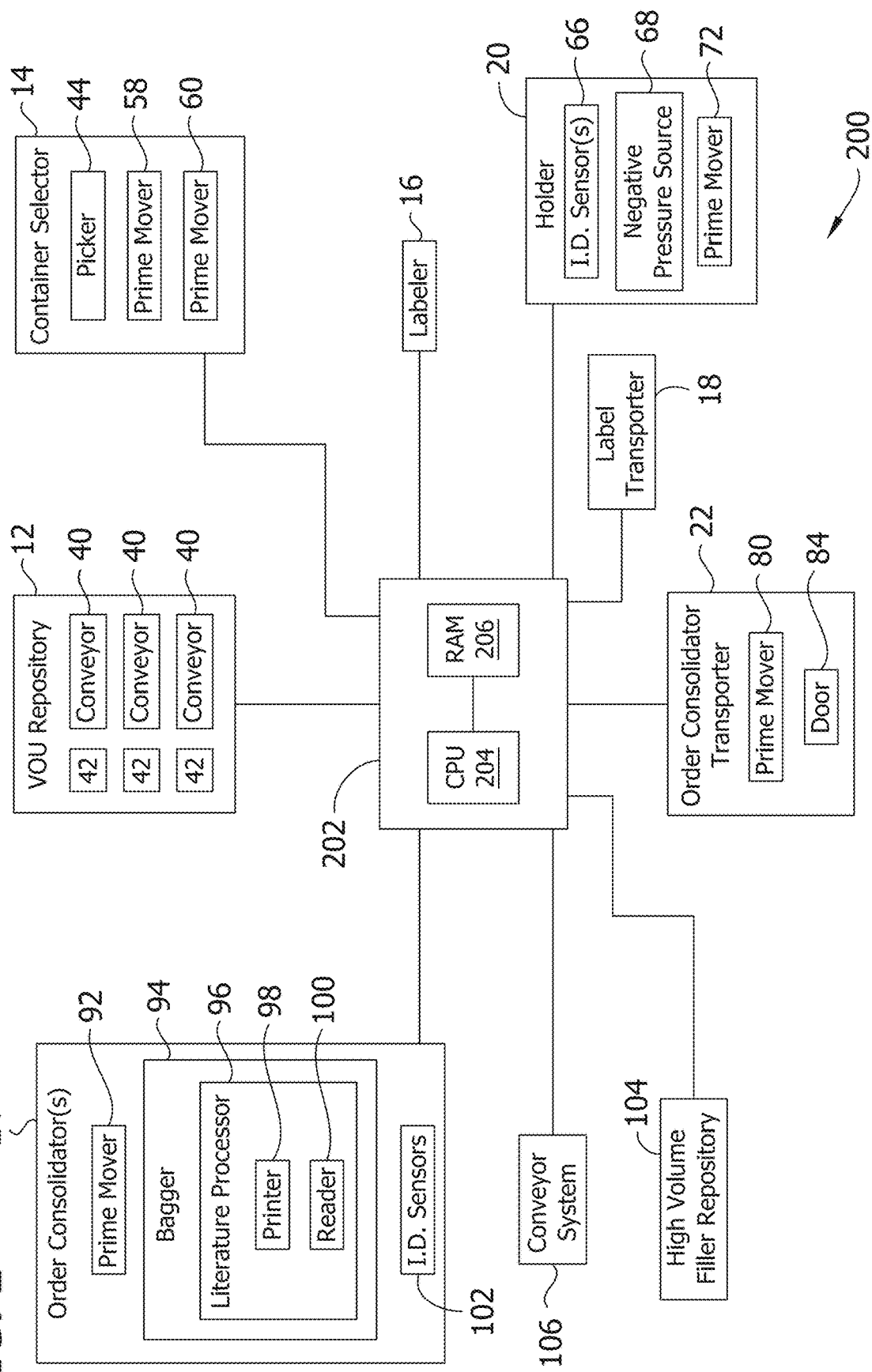
FIG. 2 is a schematic diagram of an example control system for the pharmaceutical order processing system.

Referring to FIG. 2, an example control system (e.g. pharmaceutical order processing system control system) of the system 10 is generally indicated by reference numeral 200. The control system 200 includes a controller 202 (broadly, a computer) for controlling and operating the system 10 and its components. The controller 202 includes a CPU or processor 204 (e.g., a pharmaceutical order processing system processor) and RAM or memory 206 (broadly, non-transitory computer readable storage medium). The controller 202 directs (e.g., controls and operates) the various components (e.g., the first repository 12, the container selector 14, the labeler 16, the label transporter 18, the container holder 20, the order consolidator transporter 22, the order consolidator 24, the second repository 104, and the conveyor system 106) and subcomponents (e.g., identification sensors 66, 102, etc.) thereof. Broadly, the memory 206 includes (e.g., stores) processor-executable instructions for controlling the operation of the system 10 and the components thereof. The instructions embody one or more functional aspects of the system 10 and components thereof (as described herein), with the processor 202 executing the instructions to perform said one or more functional aspects. The components of the system 10 may be in wired or wireless communication with the controller 202. Other configurations of the control system 200 are within the scope of the present disclosure.

The controller 202 is communicatively coupled to the various components of the system 10, such as the container selector 14, the order consolidator 24, etc. to control and/or operate these components. The controller 202 is configured to receive a prescription order for a patient and to direct (e.g., operate), as described herein, the system 10 to fulfill the prescription order (e.g., prepare a package for shipping containing the one or more pharmaceutical containers C that the prescription order calls for). For example, the controller 202 can operate the container selector 14 and the order consolidator transporter 22 to move a pharmaceutical container C from the first receptacle 12 to one of the order consolidators 24. In another example, the controller 202 can receive identifying information (e.g., a serial number) of the pharmaceutical container C from the holder 20 (e.g., identification sensors 66) and compare the identifying information to the prescription order to verify whether or not the correct pharmaceutical container was selected from the repository 12 by the container selector 14. If the wrong pharmaceutical container C was picked, the controller 202 may instruct the order consolidator transporter 22 to move the pharmaceutical container an alternative location (e.g., a removal location) due to the pharmaceutical container not being the correct type for the pharmaceutical order. The controller 202 may also provide information (e.g., patient name, prescription information, etc.) to the labeler 16 for the creation of the label for the pharmaceutical container C. The controller 202 can also direct the literature processor 96 to prepare (e.g., print) the literature for a prescription order. The controller 202 may also direct the order consolidator 24 to which the order consolidator transporter 22 delivers the pharmaceutical container C. Other types of information can also be shared between the controller 202 and the components of the system 10. For example, the controller 202 can send the location of a particular type of pharmaceutical container C on the first repository 12 to the container selector 14. In this embodiment, the location of the pharmaceutical container C may be obtained by a user input device (not shown) communicatively coupled to the controller 202 or by an identification sensor (e.g., scanner) (not shown) communicatively coupled to the controller 202. In one embodiment, the controller 202 is configured to operate the container selector 14 to pick a pharmaceutical container C from the first repository 12 in response to information (e.g., prescription information) obtained by the reader 100 of the literature processor 96. For example, in one embodiment, the printer 98 of the literature processor 96 prints all the literature for all the pharmaceutical containers C associated with a prescription order in response to one of the pharmaceutical containers C from the second repository 104 being scanned by the order consolidator 24. The reader 100 of the literature processor 96 then reads the printed literature. If the literature includes literature associated with a pharmaceutical container C stored in the first repository 12, this information may be sent to the controller 202 which then directs the system 10 (e.g., operates the container selector 14, the holder 20, the label transporter 18, the labeler 16, and the order consolidator transporter 22) to bring the pharmaceutical container from the first repository to the order consolidator 24, so it can be packaged with the pharmaceutical container from the second repository 104. Accordingly, it is understood the controller 202 directs the components of the system 10 as necessary to perform the functions described herein.

Figure 3:
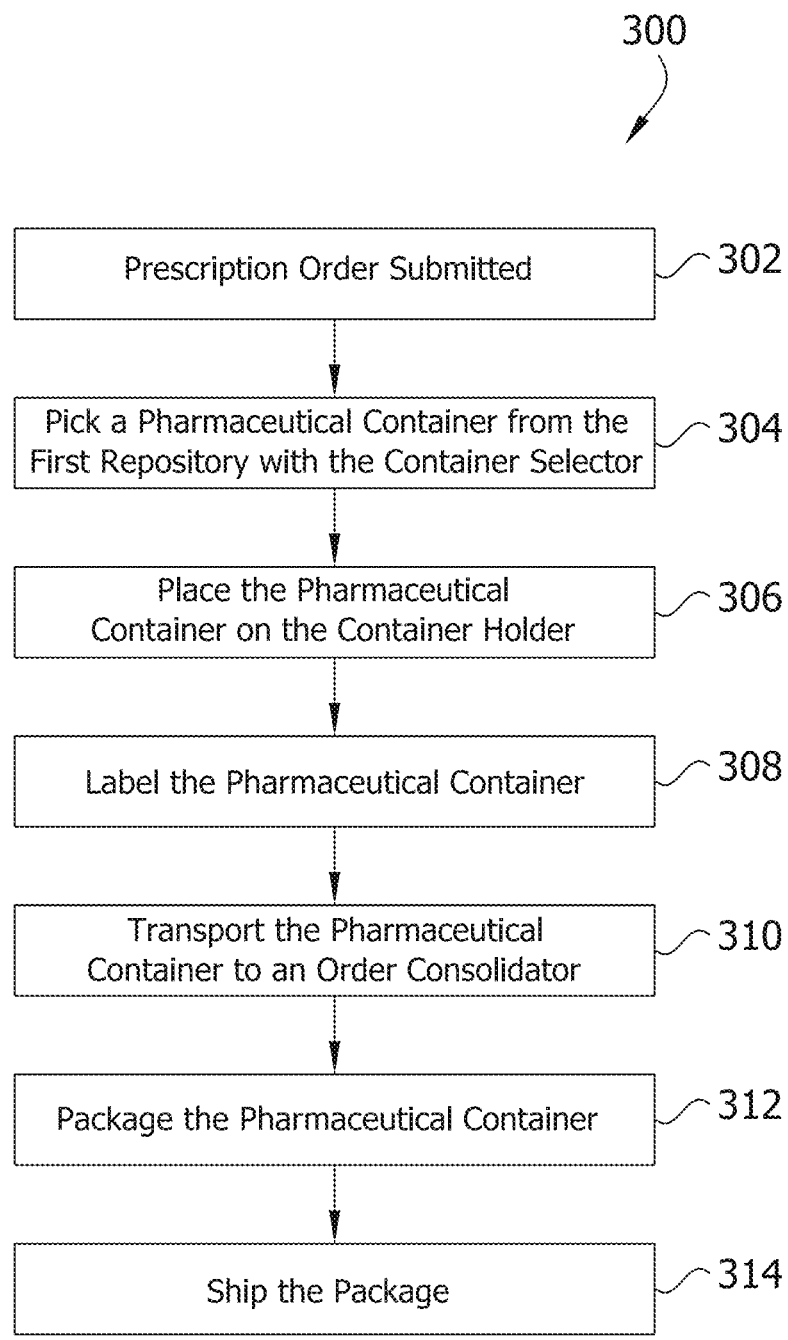
FIG. 3 is an example flow diagram of the operation of the pharmaceutical order processing system according to one embodiment of the present disclosure.

Referring to FIG. 3, an example flow diagram illustrating one method of operation of the system 10 is generally indicated at reference numeral 300. Initially, at step 302, a prescription order is submitted, by a patient or a doctor, to the system 10 (e.g., controller 202) for fulfillment by the system. At step 304, the container selector 14 picks a pharmaceutical container C from the first repository 12 to fill the prescription order. This may include moving the carriage 48 supporting the picker 44 relative to the first repository 12. The picker then picks the pharmaceutical container C form the first repository 12 (e.g., a pick-up location). As mentioned above, the first repository 12 supports (e.g., stores) a plurality of pharmaceutical containers C which were previously loaded into the repository by an operator. After the pharmaceutical container C is picked by the picker 44, the conveyor 40 then moves the row of pharmaceutical containers, from which the pharmaceutical container was picked, toward the pick-up location to position a subsequent pharmaceutical container at the pick-up location. The controller 202 may instruct the container selector 14 to pick a pharmaceutical container C in response to receiving the prescription order or in response to the literature processor 96 (FIG. 4). For example, if the controller 202 determines the prescription order only requires unit-of-use pharmaceutical containers C to fulfill the order, the controller may then proceed to instruct the container selector 14 to pick the pharmaceutical containers C from the first repository 12. In the method of operation 300 illustrated in FIG. 3, the controller 202 has determined the prescription order only requires unit-of-use pharmaceutical containers C and proceeds accordingly. After the pharmaceutical container C is picked by the container selector 14, the container selector (e.g., picker 44 and/or carriage 48) moves the pharmaceutical container C toward the container holder 20.

At step 306, the container selector 14 (e.g., picker 44) places (e.g., delivers) the pharmaceutical container C on the container holder 20. The container selector 14 is then free to pick another pharmaceutical container C from the repository 12. The pharmaceutical container C held by the container holder 20 is then scanned or read by the identification sensors 66 to obtain the identity (e.g., identity information) of the pharmaceutical container. The controller 202 uses the obtained identity to confirm the correct pharmaceutical container C has been picked from the repository 12. After the identity of the pharmaceutical container C is confirmed, the container is grabbed by the label transporter 18 from the container holder 20. The label transporter 18 transports (e.g., moves) the pharmaceutical container C to the labeler, which then applies a label to the pharmaceutical container at step 308. After the label is applied, the label transporter 18 delivers the pharmaceutical container C to the order consolidator transporter 22. At step 310, the order consolidator transporter 22 transports (e.g., moves, carries) the pharmaceutical container to one of the order consolidators 24 (as directed by the controller 202). The order consolidator transporter 22 moves into alignment with the chute 86 of the order consolidator 24 and then opens the door 84 to permit the pharmaceutical container C to drop down into the chute (thereby delivering the pharmaceutical container to the order consolidator 24). In other embodiments, the order consolidator transporter 22 may deliver the pharmaceutical container C directly to a bagger 94, instead of an order consolidator 24.

The order consolidator then packages the pharmaceutical container C in a shipping package, at step 312. The pharmaceutical container C moves in the chute 86 of the order consolidator 24, via dividers 90, toward the bagger 94.

Before the pharmaceutical container C reaches the bagger 94, the identity of the pharmaceutical container C is again confirmed by identification sensors 102, which is generally the same process involving identification sensors 66 and thus a detailed description is omitted herein. After the identity is confirmed, the container is transferred to the bagger 94, which packages the container in the shipping package. The literature processor 96 of the bagger 94 prepares the literature associated with the pharmaceutical container C and the literature is added (e.g., packed) in the shipping package with the container. The literature processor 96 may prepare the literature in response to the identity of the pharmaceutical container C being confirmed with the identification sensors 102 of the order consolidator 24. The package is then shipped to the patient at step 314. The operation 300 then repeats for the next prescription order (e.g., pharmaceutical container C). It is understood, that many of these processes or steps of operation 300 can happen simultaneously with different pharmaceutical containers C. For example, the bagger 94 can be packaging a first pharmaceutical container C, while the order consolidator transporter 22 is delivering a second pharmaceutical container, while the labeler 16 is applying a label to the third pharmaceutical container, and/or while the container selector 14 is picking a fourth pharmaceutical container.

Referring to FIG. 4, an example flow diagram illustrating another method of operation of the system 10 is generally indicated at reference numeral 400. In this method of operation 400, pharmaceutical containers C from different sources (e.g., the first repository 12 and the second repository 104) are combined together. Initially, at step 402, a prescription order is submitted, by a patient or a doctor, to the system 10 (e.g., controller 202) for fulfillment by the system. In this method, the controller 202 determines the prescription order requires pharmaceutical containers C from both the first and second repositories 12, 104 (e.g., at least one container from the second repository). Accordingly, the controller 202 instructs the second repository 104 to supply a pharmaceutical container C (e.g., a first pharmaceutical container) to the order consolidator 24, at step 404. In the example embodiment, the second repository 104 is an automated filler that fills the first pharmaceutical container C with the quantity of pharmaceuticals required by the prescription order. The first pharmaceutical container C from the second repository 104 is then delivered to the order consolidator 24, via the conveyor system 106. Identification sensors (not shown) of the order consolidator 24 may then scan the first pharmaceutical container C to verify/determine the identity of the first pharmaceutical container. In response to scanning the first pharmaceutical container C, the printer 98 of the literature processor 96 may print the literature associated with the prescription order containing the first pharmaceutical container, at step 406. The literature printed by the printer 98 includes the literature of all the pharmaceutical containers C associated with the prescription order (including the literature associated with the pharmaceutical container from the first repository 12). The reader 100 of the literature processor 96 may then read the printed literature, at step 408. The controller 202 uses the information from the reader 100 to determine what, if any, pharmaceutical container(s) C (e.g., second pharmaceutical container) to pick from the first repository 12. At step 410, the controller 202 operates the system 10 to transport the second pharmaceutical container C from the first repository 12 to the order consolidator 24, as described above in steps 304-310.

After the first and second pharmaceutical containers C (and any other pharmaceutical containers) of the prescription order are at the order consolidator 24, the order consolidator packages the first and second pharmaceutical containers together in the same shipping package. The order consolidator 24 moves the first pharmaceutical container C from the second repository 104 to the bagger 94. The order consolidator 24 also moves the second pharmaceutical container C from the first repository 12 to the bagger 94, as described above. The order consolidator 24 may move the first and second pharmaceutical containers C generally simultaneously to the bagger 94 or one after another. The bagger 94 then packages the first and second pharmaceutical containers C and associated literature together in the same shipping package, at step 412. The package is then shipped to the patient at step 414. The operation 400 then repeats for the next prescription order (e.g., pharmaceutical containers C). It is understood, that many of these processes or steps of operation 400 can be happing simultaneously with different pharmaceutical containers C. For example, the bagger 94 can be packaging pharmaceutical containers C of a first prescription order, while the second repository is supplying a pharmaceutical container for a second prescription order to the order consolidator 24. Moreover, it is understood that both operations 300, 400 can be happening at generally the same time to fill different prescription orders.

Picking the pharmaceutical container C from the first repository 12 after the pharmaceutical container C from the second repository 104 has already arrived at the order consolidator 24 makes it easier to combine pharmaceutical containers from multiple sources. For example, pharmaceutical containers C from an automated filler repository 104 may arrive at the order consolidator 24 in a generally random manner and/or at generally unknown (e.g., unspecific) times. Accordingly, the system 10 (e.g., controller 202) needs to wait until the pharmaceutical container C from the second repository 104 has arrived at (and is identified by) the order consolidator 24, to know what pharmaceutical container(s) needs to be picked from the first repository 12 to complete the prescription order. The order consolidator 24 may stage several (e.g., a plurality of) pharmaceutical containers C from the second repository 104, so that the system 10 may transport the pharmaceutical container from the first repository 12 while other pharmaceutical containers are being packaged together. Staging increases the efficiency of the system 10 (e.g., order consolidator's 24) by minimizing unnecessary down time. Other ways of using the system 10 are within the scope of the present disclosure.

Although described in connection with an example computing system environment, embodiments of the aspects of the disclosure are operational with numerous other general purpose or special purpose computing system environments or configurations. The computing system environment is not intended to suggest any limitation as to the scope of use or functionality of any aspect of the disclosure. Moreover, the computing system environment should not be interpreted as having any dependency or requirement relating to any one or combination of components illustrated in the example operating environment. Examples of well-known computing systems, environments, and/or configurations that may be suitable for use with aspects of the disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the disclosure.

Embodiments of the aspects of the disclosure may be implemented with processor-executable instructions. The processor-executable instructions may be organized into one or more processor-executable components or modules on a tangible processor readable storage medium. Aspects of the disclosure may be implemented with any number and organization of such components or modules. For example, aspects of the disclosure are not limited to the specific processor-executable instructions or the specific components or modules illustrated in the figures and described herein. Other embodiments of the aspects of the disclosure may include different processor-executable instructions or components having more or less functionality than illustrated and described herein.

The order of execution or performance of the operations in embodiments of the aspects of the disclosure illustrated and described herein is not essential, unless otherwise specified. That is, the operations may be performed in any order, unless otherwise specified, and embodiments of the aspects of the disclosure may include additional or fewer operations than those disclosed herein. For example, it is contemplated that executing or performing a particular operation before, contemporaneously with, or after another operation is within the scope of aspects of the disclosure.

It is apparent that the elements, features, and/or teachings set forth in each embodiment disclosed herein are not limited to the specific embodiment(s) the elements, features and/or teachings are described in. Accordingly, it is understood that the elements, features and/or teachings described in one embodiment may be applied to one or more of the other embodiments disclosed herein, even if said elements, features and/or teachings where not described herein as being a part of said one or more of the other embodiments.

The Title, Field, and Background are provided to help the reader quickly ascertain the nature of the technical disclosure. They are submitted with the understanding that they will not be used to interpret or limit the scope or meaning of the claims. They are provided to introduce a selection of concepts in simplified form that are further described in the Detailed Description. The Title, Field, and Background are not intended to identify key features or essential features of the claimed subject matter, nor is it intended to be used as an aid in determining the claimed subject matter.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the disclosure are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the disclosure by way of example and not by way of limitation. This description enables one skilled in the art to make and use the aspects of the disclosure, and describes several embodiments, adaptations, variations, alternatives and uses of the aspects of the disclosure, including what is presently believed to be the best mode of carrying out the aspects of the disclosure. Additionally, it is to be understood that the aspects of the disclosure is not limited in its application to the details of construction and the arrangement of components set forth in the description or illustrated in the drawings. The aspects of the disclosure are capable of other embodiments and of being practiced or carried out in various ways. Also, it will be understood that the phraseology and terminology used herein is for the purpose of description and should not be regarded as limiting.

Having described aspects of the disclosure in detail, it will be apparent that modifications and variations are possible without departing from the scope of aspects of the disclosure as defined in the appended claims. It is contemplated that various changes could be made in the above constructions, products, and methods without departing from the scope of aspects of the disclosure. In the preceding specification, various embodiments have been described with reference to the accompanying drawings. It will, however, be evident that various modifications and changes may be made thereto, and additional embodiments may be implemented, without departing from the broader scope of the aspects of the disclosure as set forth in the claims that follow. The specification and drawings are accordingly to be regarded in an illustrative rather than restrictive sense.

What is claimed is:

1. A pharmaceutical order processing system for processing a plurality of pharmaceutical containers, the pharmaceutical order processing system comprising:
   a first pharmaceutical container repository configured to support a first group of pharmaceutical containers of the plurality of pharmaceutical containers;
   a container selector including a picker configured to pick one or more pharmaceutical containers of the first group of pharmaceutical containers from the pharmaceutical container repository, the container selector including a carriage supporting the picker, the carriage movable relative to the pharmaceutical container repository to move the picker to different locations relative to the pharmaceutical container repository;
   an order consolidator configured to receive the one or more pharmaceutical containers of the first group and to pack the one or more pharmaceutical containers of the first group in a shipping package; and
   an order consolidator transporter configured to receive the one or more pharmaceutical containers of the first group after the one or more pharmaceutical containers have been picked by the picker and to transport the one or more pharmaceutical containers of the first group toward the order consolidator.

2. The pharmaceutical order processing system of claim 1, wherein the first pharmaceutical container repository includes a plurality of racks configured to hold the plurality of pharmaceutical containers of the first group, each rack including at least one conveyer supporting at least a portion of the pharmaceutical containers of the first group and configured to move the portion of the pharmaceutical containers of the first group toward a pick-up location where container selector picks one of the pharmaceutical containers, wherein the at least one conveyor is arranged to be engaged by and support bottoms of said at least a portion of the pharmaceutical containers of the first group.

3. The pharmaceutical order processing system of claim 1, wherein the order consolidator includes a chute configured to receive the one or more pharmaceutical containers of the first group from the order consolidator transporter, the chute being configured to store the one or more pharmaceutical containers in a generally stacked arrangement.

4. The pharmaceutical order processing system of claim 1, wherein the order consolidator includes a literature reader configured to read literature associated with the pharmaceutical containers of the first group, and wherein the container selector is configured to pick the one or more pharmaceutical containers of the first group based on the read literature by the literature reader of the order consolidator.

5. The pharmaceutical order processing system of claim 1, wherein the container selector includes a gantry including a first rail and a second rail moveably mounted on the first rail for movement along the first rail in a first direction, the carriage being moveably mounted on the second rail for movement along the second rail in a second direction generally perpendicular to the first direction.

6. The pharmaceutical order processing system of claim 1, wherein the carriage is movable in at least one of a generally horizontal direction or a generally vertical direction.

7. The pharmaceutical order processing system of claim 6, wherein the carriage is movable in the generally horizontal direction and the generally vertical direction.

8. The pharmaceutical order processing system of claim 1, wherein the order consolidator is a first order consolidator, the pharmaceutical order processing system further including a second order consolidator configured to receive one or more pharmaceutical containers of the first group and to pack the one or more pharmaceutical containers of the first group in a second shipping package.

9. The pharmaceutical order processing system of claim 8, wherein the order consolidator transporter is configured to transport the one or more pharmaceutical containers of the first group to the first order consolidator or the second order consolidator.

10. The pharmaceutical order processing system of claim 1, further comprising a labeler configured to apply a label to each pharmaceutical container of the first group.

11. The pharmaceutical order processing system of claim 10, further comprising a label transporter configured to transport the one or more pharmaceutical containers of the first group after the one or more pharmaceutical containers of the first group have been picked by the picker to the labeler.

12. The pharmaceutical order processing system of claim 11, further comprising a container holder configured to receive and hold the one or more pharmaceutical containers of the first group from the container selector, and wherein the label transporter is configured to grab the one or more pharmaceutical containers of the first group from the container holder.

13. The pharmaceutical order processing system of claim 12, wherein the label transporter is configured to deliver the one or more pharmaceutical containers of the first group to the order consolidator transporter.

14. The pharmaceutical order processing system of claim 13, wherein the container holder includes one or more identification sensors configured to scan the one or more pharmaceutical containers of the first group to verify the identity of the one or more pharmaceutical containers of the first group.

15. The pharmaceutical order processing system of claim 1, wherein the order consolidator includes a bagger configured to pack the one or more pharmaceutical containers of the first group in a shipping package.

16. The pharmaceutical order processing system of claim 15, wherein the order consolidator includes a literature processor configured to supply literature to the bagger, the bagger configured to pack the literature with the one or more pharmaceutical containers of the first group in the shipping package.

17. The pharmaceutical order processing system of claim 15, wherein the order consolidator includes a plurality of platforms, each platform arranged to support the one or more pharmaceutical containers of the first group, each platform being moveable toward the bagger to deliver the one or more pharmaceutical containers of the first group to the bagger.

18. The pharmaceutical order processing system of claim 17, wherein the plurality of platforms are arranged relative to one another to deliver the one or more pharmaceutical containers of the first group to the bagger one at a time and one platform after another platform.

19. The pharmaceutical order processing system of claim 18, wherein the plurality of platforms are arranged in a vertical stack.

20. The pharmaceutical order processing system of claim 1, further comprising a second pharmaceutical container repository configured to supply a second group of pharmaceutical containers of the plurality of pharmaceutical containers, the order consolidator configured to receive one or more pharmaceutical containers of the second group and place the one or more pharmaceutical containers of the second group in the shipping package with the one or more pharmaceutical containers of the first group.

21. The pharmaceutical order processing system of claim 20, wherein the second pharmaceutical container repository comprises a high-volume filler configured to fill the pharmaceutical containers of the second group with pharmaceuticals.

22. The pharmaceutical order processing system of claim 20, wherein the order consolidator transporter is arranged to deliver the one or more pharmaceutical containers of the first group to the order consolidator, the pharmaceutical order processing system further comprising a container transporter different than the order consolidator transporter, the container transporter arranged to transport and deliver the one or more pharmaceutical containers of the second group to the order consolidator.

23. The pharmaceutical order processing system of claim 22, wherein the order consolidator transporter is arranged to deliver the one or more pharmaceutical containers of the first group to the order consolidator at a first location, and wherein the container transporter is arranged to deliver the one or more pharmaceutical containers of the second group to the order consolidator at a second location different than the first location.

24. The pharmaceutical order processing system of claim 22, wherein the container transporter is arranged to receive the one or more pharmaceutical containers of the second group from the second pharmaceutical container repository and transport the one or more pharmaceutical containers of the second group to the order consolidator.

25. The pharmaceutical order processing system of claim 22, wherein the container transporter and the order consolidator transporter are configured to operate independently of one another.

26. A method for processing a plurality of pharmaceutical containers, the method comprising:
supporting, with a first pharmaceutical container repository, a first group of pharmaceutical containers of the plurality of pharmaceutical containers;
moving a picker relative to the pharmaceutical container repository;
picking, with the picker, one or more pharmaceutical containers from the first group of pharmaceutical containers from the pharmaceutical container repository;
transporting, with an order consolidator transporter, the one or more pharmaceutical containers of the first group to an order consolidator; and
packaging, with the order consolidator, the one or more pharmaceutical containers of the first group in a shipping package.

27. The method of claim 26, further comprising:
delivering one or more pharmaceutical containers of a second group of pharmaceutical containers of the plurality of pharmaceutical containers from a second pharmaceutical container repository to the order consolidator; and
packaging, with the order consolidator, the one or more pharmaceutical containers of the second group in the shipping package with the one or more pharmaceutical containers of the first group.

28. The method of claim 26, wherein the picker is supported by a carriage, and wherein moving the picker comprises moving the carriage in at least one of a generally horizontal direction or a generally vertical direction.

29. The method of claim 26, further comprising:
reading, with a literature pack reader, literature associated with the pharmaceutical containers of the first group to determine the one or more pharmaceutical containers of the first group to pick.

30. The method of claim 26, further comprising:
placing, with the picker, the one or more pharmaceutical containers of the first group on a container holder;
grabbing, with a label transporter, the one or more pharmaceutical containers of the first group from the container holder;
transporting, with the label transporter, the one or more pharmaceutical containers of the first group to a labeler;
applying, with the labeler, a label to each of the one or more pharmaceutical container of the first group; and
delivering, with the label transporter, the one or more pharmaceutical containers of the first group to the order consolidator transporter.

* * * * *